March 12, 1968 R. H. JAMES 3,373,411

MEMORY APPARATUS AND METHOD FOR SAMPLING TRANSIENT ELECTRICAL SIGNALS

Filed Nov. 6, 1963

4 Sheets-Sheet 1

INVENTOR
RAYMOND H. JAMES
BY Herbert E. Sonnemeyer
ATTORNEY

March 12, 1968 R. H. JAMES 3,373,411

MEMORY APPARATUS AND METHOD FOR SAMPLING TRANSIENT ELECTRICAL SIGNALS

Filed Nov. 6, 1963 4 Sheets-Sheet 4

3,373,411
MEMORY APPARATUS AND METHOD FOR SAMPLING TRANSIENT ELECTRICAL SIGNALS

Raymond H. James, Bloomington, Minn., assignor to Sperry Rand Corporation, New York, N.Y., a corporation of Delaware Filed Nov. 6, 1963, Ser. No. 321,909
17 Claims. (Cl. 340—174)

ABSTRACT OF THE DISCLOSURE

A magnetic memory device that stores discrete levels of data as a function of the degree of the partial switching of the device's magnetizable element's magnetic flux.

The value of the utilization of small cores of magnetizable material as logical memory elements in electronic data processing systems is well known. This value is based upon the bistable characteristics of magnetizable cores which include the ability to retain or remember magnetic conditions which may be utilized to indicate a binary "1" or a binary "0." As the use of magnetizable cores in electronic data processing equipment increases, a primary means of improving the computational speed of these machines is to utilize memory elements that possess the property of nondestructive readout, for by retaining the initial state of remanent magnetization after readout the rewrite cycle required with destructive readout devices is eliminated. As used herein, the term "nondestructive readout" shall refer to the sensing of the relative directional-state of the remanent magnetization of a magnetizable core without destroying or reversing such remanent magnetization. This should not be interpreted to mean that the state of the remanent magnetization of the core being sensed is not temporarily disturbed during such nondestructive readout.

Ordinary magnetizable cores and circuits ultized in destructive readout devices are now so well known that they need no special description herein, however, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient magnitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the threshold characteristic of a core having a substantially rectangular hysteresis characteristic. In this technique, a minimum of two interrogate lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture, with a transverse interrogate field, i.e., an externally applied field directed across the core's internal flux applied by a second low remanent-magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article "The Transfluxor" Rajchman and Lo, Proceedings of the IRE, March 1956, pp. 321–332. This method utilizes a "transfluxor" which comprises a core of magnetizable material of a substantially rectangular hysteresis characteristic having at least a first large aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on read-out of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is considerably less than the flux density of the second stable state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, Supplement, vol. 32, No. 3, pp. 38S–39S, March 1961, provides excellent background material for the switching technique utilized in the present invention.

The magnetic conditions and their definitions as discussed above may now be itemized as follows:

*Partial switching*

Amplitude-limited-condition wherein with a constant drive field amplitude, increase of the drive field duration will cause no appreciable increase in core flux density.

Time-limited-condition wherein with a constant drive field amplitude, increase of the drive field duration will cause appreciable increase in core flux density.

*Complete switching*

Saturated-condition wherein increase of the drive field amplitude and duration will cause no appreciable increase in core flux density.

Stable-state-condition of the magnetic state of the core when the core is not subjected to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The preferred embodiment of the present invention is concerned with the establishment of a predeterminably variable magnetic flux level in a magnetizable memory device which flux level is representative of the amplitude of an incremental portion of a transient electrical signal. In the preferred embodiment an incremental portion of a transient signal from a first constant current source is gated into the magnetic device by a strobe pulse from a second constant current source. The maximum amplitude of the transient signal is limited to a level well below the switching threshold of the magnetic device such that the transient signal alone is incapable of effecting the flux level of the magnetic device. The strobe pulse is of an amplitude sufficient to switch the flux state of the magnetic device from a first saturated state to a second and opposite saturated state but is of such a limited duration so as to preclude such complete flux reversal. However, such duration is sufficient to set the flux level in an intermediate time-limited flux state. Different incremental portions of the transient signal may be gated into the magnetic device by delaying the transient signal different time increments with respect to the strobe pulse; each different time delayed increment of the transient signal is gated by the strobe pulse into a separate magnetic device so that each separate magnetic device stores a flux level representative of the net magnetomotive force effect of the strobe pulse and that portion of the transient signal gated by the strobe pulse. The terms "signal," "pulse," etc., when used herein shall be used interchangeably to refer to the current signal that produces the corresponding magnetic field and to the magnetic field that is produced by the corresponding current signal.

Accordingly, it is a primary object of the present invention to provide a device and a method for the sampling of a constant current source transient electrical signal.

It is a further object of the present invention to provide a device and a method for the flux gating of an incremental portion of a constant current source transient electrical signal by a constant current source time-limited strobe pulse.

It is a further object of the present invention to provide a device and a method whereby an analog signal is sampled by a strobe pulse wherein the duration of the sampled portion of the analog signal is determined by the duration of the strobe pulse.

It is a further and more general object of the present invention to provide a novel method of operating a magnetic memory element as an analog signal sampling device.

These and other more detailed and specific objects will be disclosed in the course of the following specification, reference being had to the accompanying drawings, in which.

To better understand a novel aspect of the present invention, a discussion of a constant current source driving signal as opposed to the use of a constant voltage source driving signal is presented.

Figure 1:
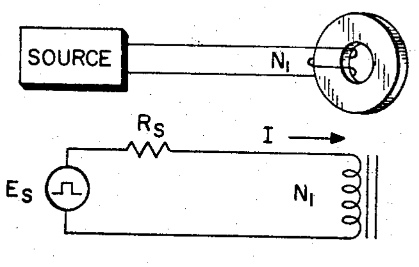
FIG. 1 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 1 illustrates the general circuit of a source driving a toroidal ferrite core with its equivalent circuit:

$E_s$=source voltage,
$R_s$=source internal resistance,
$N_1$=number of turns in the coil about the core,
I=current flowing through the coil about the core.

This circuit may be defined mathematically by Equation 1

$$E_s=IR_s-N\frac{d\phi}{dt} \qquad (1)$$

with it being assumed that the core is always initially in its negative saturated state and that the drive signal from the source drives the magnetic state of the core toward its positive saturated state. If $R_s$ is made small, Equation 1 reduces to Equation 2:

$$E_s\cong -N\frac{d\phi}{dt} \qquad (2)$$

Therefore by making $R_s$ small the conditions of a constant voltage source are fulfilled. Since $E_s$ and N are constants, $d\phi/dt$ is also a constant, and consequently the flux reversal is a linear function of time.

$$\int_{-\phi_s}^{\pm\phi_1} d\phi=\frac{E_s}{N_1}\int_0^t dt$$

$$\phi_s-\phi_1=\frac{E_s t}{N_1} \qquad (3)$$

For a complete flux reversal the integral, taken from $-\phi_s$ to $+\phi_s$, is (with $T_s$=time required for a complete flux reversal from $-\phi_s$ to $+\phi_s$)

$$\int_{-\phi_s}^{+\phi_s} d\phi=\frac{E_s}{N_1}\int_0^{T_s} dt$$

$$2\phi_s=\frac{E_s T_s}{N_1} \qquad (4)$$

The voltage E induced in any coil about the core is (with $N_2$=the number of turns of a second coil on the core)

$$E=\frac{E_s N_2}{N_1}=\frac{2\phi_s}{T_s}N_2$$

Figure 3:
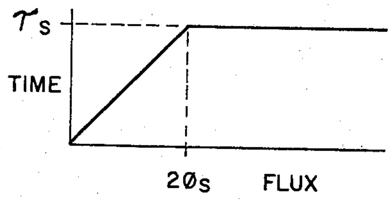
FIG. 3 is an illustration of the plot of flux versus time of the core of FIG. 2.
Figure 2:
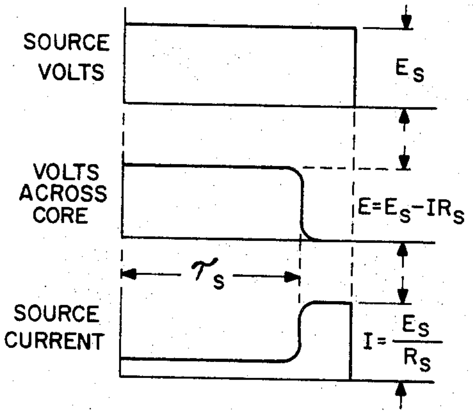
FIG. 2 is an illustration of the resulting voltages and currents of the circuit of FIG. 1 when driven by a constant voltage source.

The resulting voltages and currents under constant voltage source conditions are illustrated in FIG. 2, Equations 3 and 4 show that a plot of flux $\phi$ versus time would be as illustrated in FIG. 3. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_s$ as illustrated in FIG. 3 is due to the characteristics of the constant voltage source rather than those of the core.

If $R_s$ is made large, Equation 1 reduces to Equation 5:

$$E_s\cong IR_s \qquad (5)$$

Figure 4:
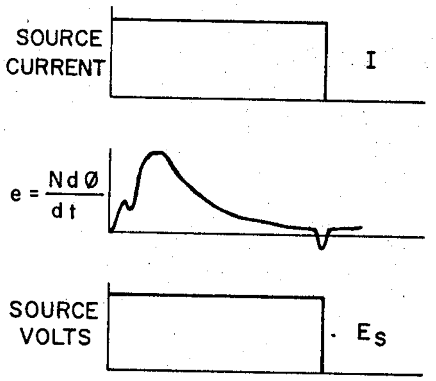
FIG. 4 is an illustration of the resulting voltages and currents of the circuit of FIG. 1 when driven by a constant current source.

Therefore, by making $R_s$ large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 4. It is under these constant current source conditions that this present invention is concerned.

Figure 5:
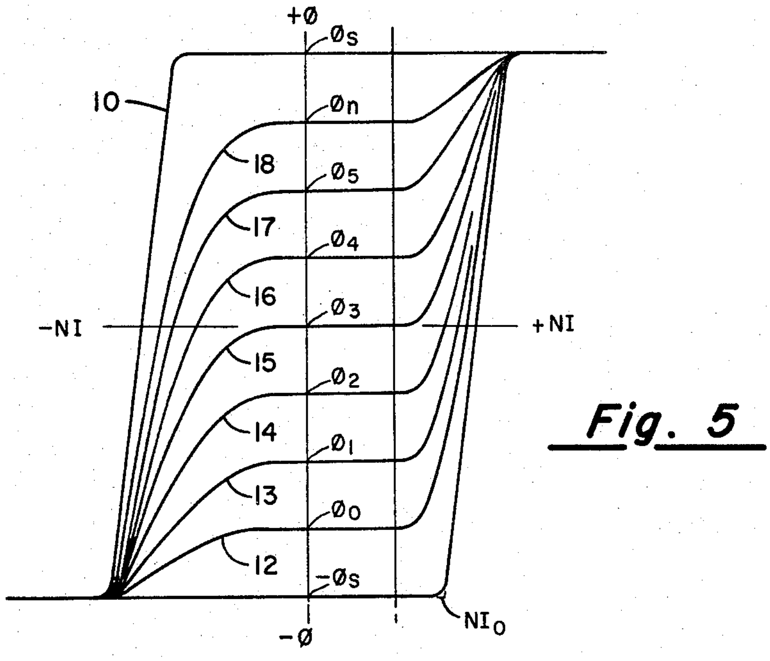
FIG. 5 is an illustration of the residual magnetization of the core of FIG. 1 utilizing the time-limited different-amplitude flux sampling strobe pulses of the present invention.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux state is given as follows:

$$\tau_s=\frac{Sw}{H-H_0}=\frac{Sw'}{NI-NI_0}$$

where $r$=radius of toroidal core
$\tau_s$=switching time
I=current in amperes
$Sw$=material constant
N=number of turns
H=applied field in oe (oersteds)$=NI/5r$
$H_0$=switching threshold in oe$=NI_0/5r$
$Sw'=Sw5r$ Since the applied field H is inversely proportional to the radius of the core, flux reversal takes place faster in an inside ring of the core than in an outside ring of the core. Applying a time-limited drive field to the core results in a flux reversal distribution that decreases with increase in radial distance. That portion of the core that is in a partially switched state exhibits magnetic properties that are similar to a demagnetized state except for the asymmetry as illustrated in FIG. 5. The amount of asymmetry and the shape of the curve for a time-limited state are functions of both the drive field amplitude and duration.

With particular reference to FIG. 5 there is illustrated a residual magnetization curve 10 of the magnetic devices utilized by the present invention. Curve 10 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 12–18 are the residual magnetization amplitude-limited curves from the respective time-limited stable-states $\phi_0$–$\phi_n$. As stated before, this time-limited partially-switched stable-state is obtained by terminating the saturating drive field current pulse before the flux reversal, as an example movement of the flux state from $-\phi_s$ to $+\phi_s$, has been completed. Then by applying drive field current pulses of different amplitudes and of a duration greater than the longest $\tau_s$ a family of curves 12–18 is obtained.

In the particular application of applicant's illustrated embodiment there is utilized a strobe pulse 20 (see FIG. 6) which is of a sufficient amplitude but of insufficient duration to switch the magnetic state of the coupled core from $-\phi_s$ to $+\phi_s$. This strobe pulse 20 is obtained from a constant current source and is limited in duration, e.g., time limited, so as to set the magnetic state of the core in the flux state $\phi_0$ of curve 12. Any increase in the amplitude of pulse 20 causes the magnetic state of the coupled core to be set into a different greater flux state such as $\phi_1$–$\phi_n$ associated with curves 12–18, respectively.

Figure 7:
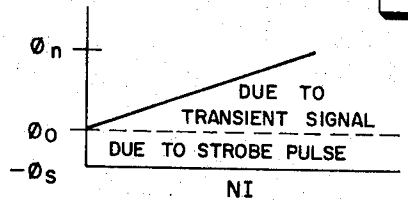
FIG. 7 is an illustration of the linearity of the plot of applied drive field and induced flux in a magnetizable memory element when operating from a constant current source as disclosed by the present invention.

With particular reference to FIG. 7 there is illustrated the linear relationship, over the range $\phi_0$–$\phi_n$, of the stable-state flux level and the strobe pulse amplitude. In applicant's present invention this variation of the strobe pulse amplitude is achieved by the concurrent action of a constant amplitude strobe pulse and a variable amplitude transient signal. Accordingly, the change in flux level is a linear function of that portion of the transient signal that is concurrent in time with and gated by the strobe pulse.

Figure 6:
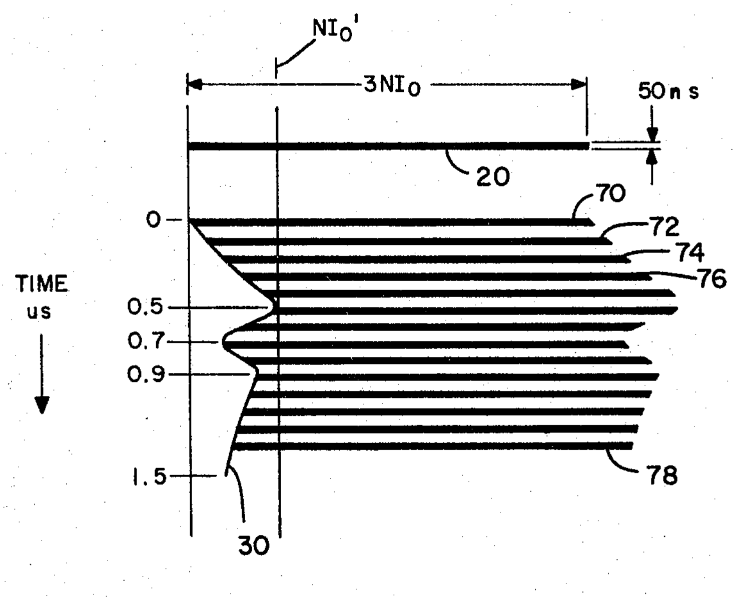
FIG. 6 is an illustration of a plot of a series of varying delayed strobe pulses upon a transient signal.

The present invention is concerned with a detector for and a method of sampling a transient current signal using the partial switching of a magnetic device. With particular reference to FIG. 6 there is illustrated a typical transient signal 30 which is to be sampled at any one or a plurality of times. Signal 30 is assumed to originate in a constant current source and is, in this embodiment, limited to a unidirectional signal whose maximum NI as regards the coupled magnetic device is less than $NI_0'$, the switching threshold. Of course, no such limitation is intended herein for a bidirectional signal of less than $NI_0'/2$ operating about a bias of $NI_0'/2$ could be utilized.

Figure 8:
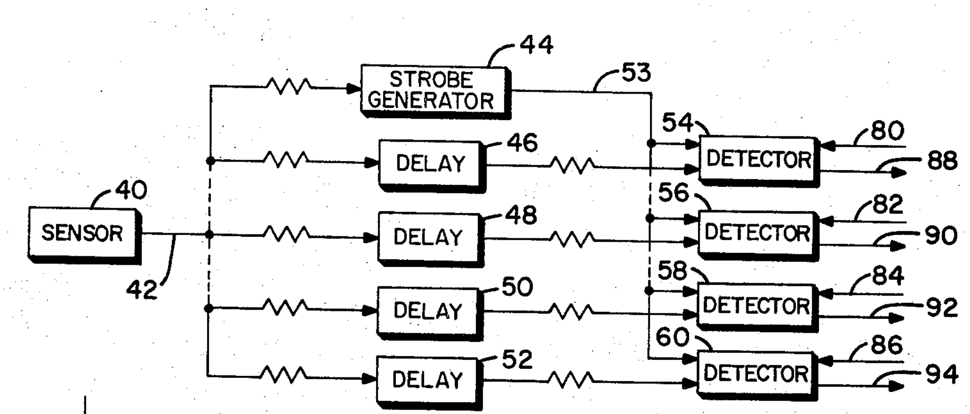
FIG. 8 is an illustration of a system providing the series of varying delayed strobe pulses and transient signal relationships of FIG. 6.

With particular reference to FIG. 8 there is illustrated a diagram of a system whereby such sampling may be accomplished. Assume that the sensor 40 detects a transient phenomenon such as a nuclear weapon burst whose radiation intensity versus time characteristic is defined by signal 30. Signal 30 is coupled to line 42 which in turn couples signal 30 to parallel arranged strobe-generator 44 and delays 46, 48, 50 and 52. Delays 46, 48, 50 and 52 may each delay signal 30 an appropriate time such as D, 3D, 5D and 7D, respectively, and accordingly strobe-generator 44, after a delay 7D, equal to the longest delay provided by the parallel arranged delays 46, 48, 50 and 52, would emit strobe pulse 20 which is simultaneously coupled by way of conductor 53 to detectors 54, 56, 58 and 60. Strobe pulse 20 acts as a constant current source flux gate gating into detectors 54, 56, 58 and 60 that portion of signal 30 that is concurrent with pulse 20. Accordingly, detector 54 having the same delay as strobe generator 44 would sample the wave front of signal 30 over the duration of strobe pulse 20 while detectors 56, 58 and 60 would sample signal 30 beginning at delays of 2D, 4D and 6D, respectively, over the duration of strobe pulse 20. As the present invention utilizes strobe pulse 20 as a flux gate to the sampled portion of signal 30 the information stored in detectors 54, 56, 58 and 60 would be the net effect of the magnetomotive force of strobe pulse 20 and the magnetomotive force of that concurrent portion of signal 30 from the various delays 46, 48, 50 and 52. As an example: in detector 60 the greatest delayed signal 30 of 7D is gated by the delayed strobe signal 20 of 7D to sample the leading edge of signal 30 as at pulse 70 of FIG. 6; in detector 58 the next greater delayed signal 30 of 5D is gated by the delayed strobe signal 20 of 7D to sample signal 30 at a delay of 2D as at pulse 72; in detector 56 the next greater delayed signal 30 of 3D is gated by the delayed strobe signal 20 of 7D to sample signal 30 at a delay of 4D as at pulse 74; while in detector 54 the least delayed signal 30 of D is gated by the delayed strobe signal 20 of 7D to sample signal 30 at a delay of 6D as at pulse 76.

As an example, assume that the system of FIG. 8 contains 14 serially arranged delay-detector sets, such as the set formed by delay 46-detector 54, that strobe pulse 20 is 50 ns. (nanoseconds) or 1D in duration and that each delay-detector set delayed signal 30 an additional increment 2D of 100 ns., i.e., the longest delay is $(2n-1)$D or 27D or 1.35 $\mu$s. (microseconds). Strobe-generator 44 would emit a strobe pulse 20 1.35 $\mu$s. after the coupling of signal 30 thereto causing the wave front of signal 30 to be sampled by the delay-detector set having the longest and similar delay as at pulse 70. The delay-detector sets having the progressively less delay of signal 30 would have progressively delayed samples of signal 30 as at pulses 72, 74, 76, etc., until the delay-detector set having the least delay of signal 30 would have the greatest delayed sample of signal 30 as at pulse 78. At this time the fourteen detectors would each have stored therein discrete levels of flux, each level indicative of the amplitude of the sampled portion of signal 30. Subsequent to the sampling procedure outlined above, the information stored in each detector could be read out by coupling a read, or interrogate, signal thereto as at readout means 80, 82, 84 and 86 causing an output signal representative of the flux level stored in each detector to be coupled to the output means 88, 90, 92 and 94, of detectors 54, 56, 58 and 60, respectively.

Figure 9:
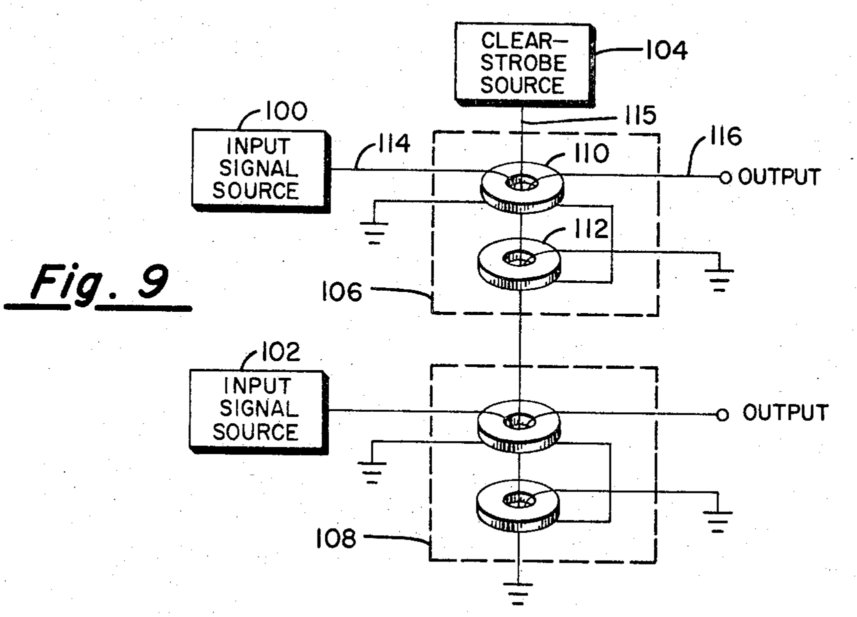
FIG. 9 is an illustration of a first embodiment of the present invention using toroidal ferrite cores as the magnetizable memory elements.
Figure 10:
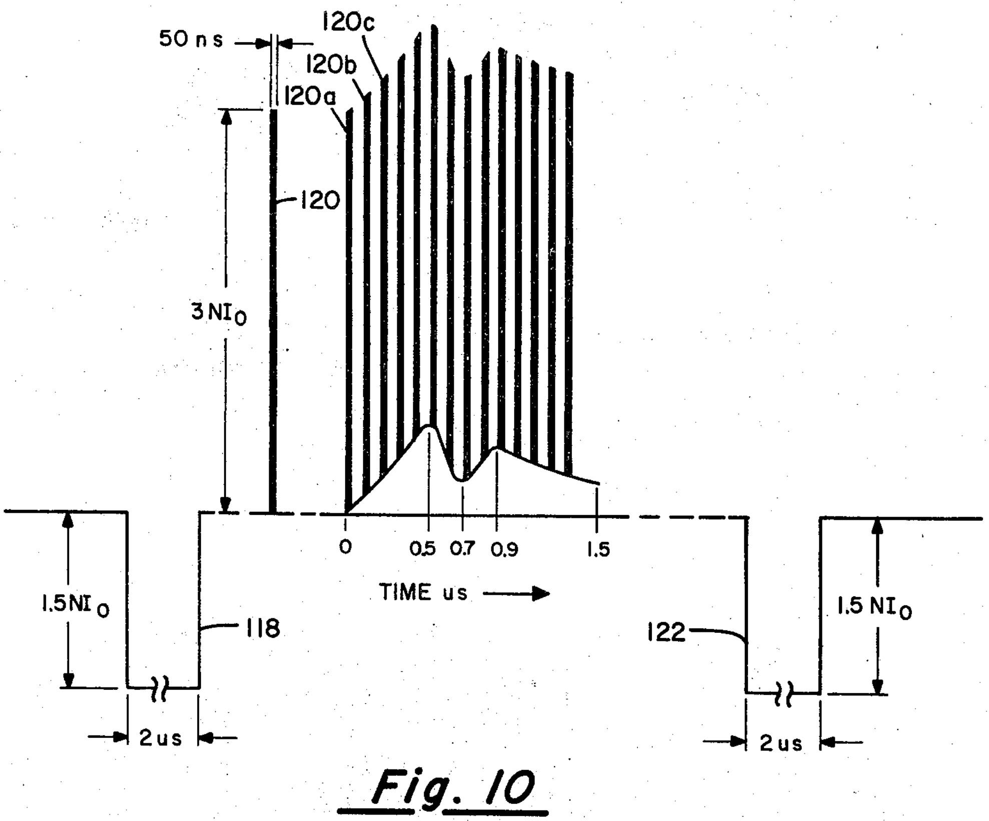
FIG. 10 is an illustration of the control signals associated with the embodiment of FIG. 9.

With particular reference to FIGS. 9 and 10 there is disclosed one embodiment of the present invention wherein the detectors are toroidal ferrite cores providing destructive readout of the information stored therein. Input signal sources 100 and 102 could be any constant current transient signal source but here are analogous to delays 46 and 52 while clear-strobe source 104 is analogous to strobe generator 44 and detectors 106 and 108 are analogous to detectors 54 and 60 of FIG. 8. Detector 106, as in detector 108, includes two cores: information core 110 and buck-out core 112. The signal defining the information to be stored in detector 106 is coupled only to core 110 in a first magnetic sense from source 100 by way of conductor 114 while the clear-strobe signal from source 104 is coupled to cores 110 and 112 in the same first magnetic sense by way of conductor 115 and the output conductor 116 is coupled to cores 110 and 112 in the first and a second and opposite magnetic sense, respectively.

The use of buck-out core 112 simplifies the readout process and allows a greater variation in strobe pulse characteristics as follows. Preparatory to the sampling operation, cores 110 and 112 are initially set into a clear state such as $-\phi_s$ of FIG. 5 by the coupling of clear pulse 118 (see FIG. 10) to conductor 115. Next, for the sampling operation, signal 30 is coupled to conductor 114 concurrently with the relatively delayed coupling of strobe pulse 120 to conductor 115. As the information signal 30 is coupled only to core 110 and as the strobe pulse 120 is coupled to both cores 110 and 112, each core is effected by a different magnetomotive force. Core 112, which is effected only by strobe pulse 120 is, for example, placed in the $\phi_0$ (see FIG. 5) state while core 110, which is effected by both signal 30 and strobe pulse 120, is placed in a state of greater flux reversal such as, for example, $\phi_1$. Upon readout, clear-strobe source 104 couples to conductor 104 read pulse 122, which is of the same magnetic sense as regards cores 110 and 112 and of the same amplitude-duration characteristic as is the clear pulse 118, causing both cores 110 and 112 to be placed back into their original $-\phi_s$ state. This change of the flux states of cores 110 and 112 from $\phi_1$ and $\phi_0$, respectively, back to their original flux state $-\phi_s$ produces a net flux change $\phi_1$–$\phi_0$ due to the oppositely wound sense of conductor 116 about cores 110 and 112. This difference flux then is the effective-output-signal producing-flux-change and accordingly produces an output signal that is substantially independent of the strobe signal 120 characteristics, and which is indicative of the amplitude of the sampled portion of signal 30.

As with the above described operation of the system of FIG. 8 the signals from sources 100 and 102 could be signal 30 delayed various delay times while the strobe pulse 120 could be delayed, preferably, at least as long as the longest delay of signal 30. As illustrated in FIG. 8 with the use of fourteen detectors, such as detectors 106 and 108, and fourteen input sources, such as input sources 100 and 102, a first input source delaying signal 30 a time $D=50$ ns. and each other input source providing a delay of an additional $2D=100$ ns. and with strobe pulse 120 being delayed an amount equal to the greatest delay of 1.35 $\mu$s., the successive magnetomotive forces of pulses 120*a*, 120*b*, 120*c*, etc., would be coupled to the detectors 106, 108, etc., at successively increasing delay times with respect to the wave front of signal 30.

Figure 11:
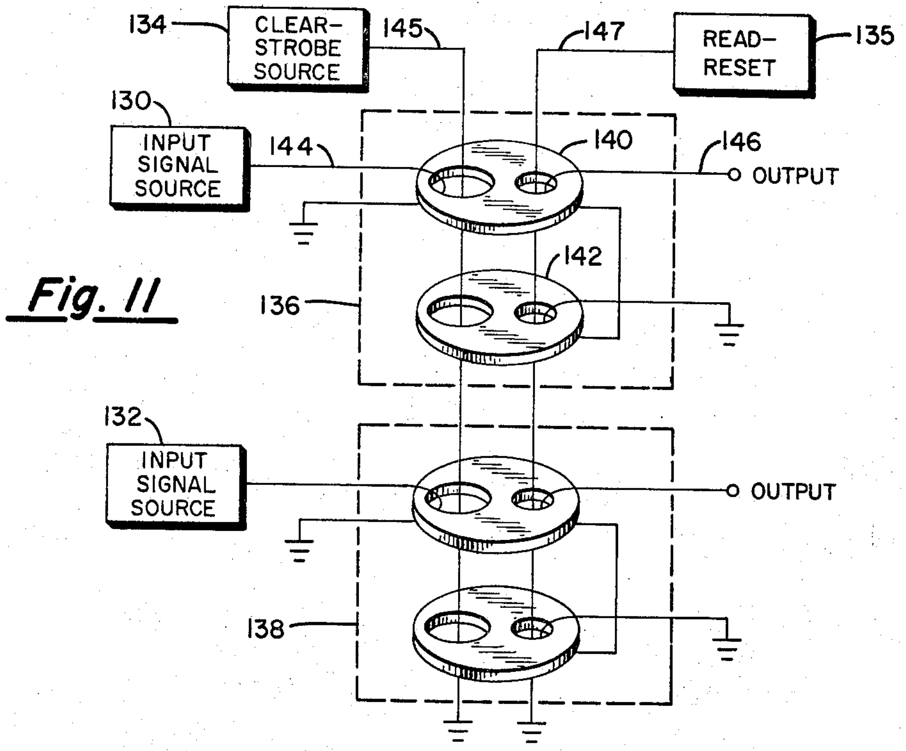
FIG. 11 is an illustration of a second embodiment of the present invention using transfluxors as the magnetizable memory elements.
Figure 12:
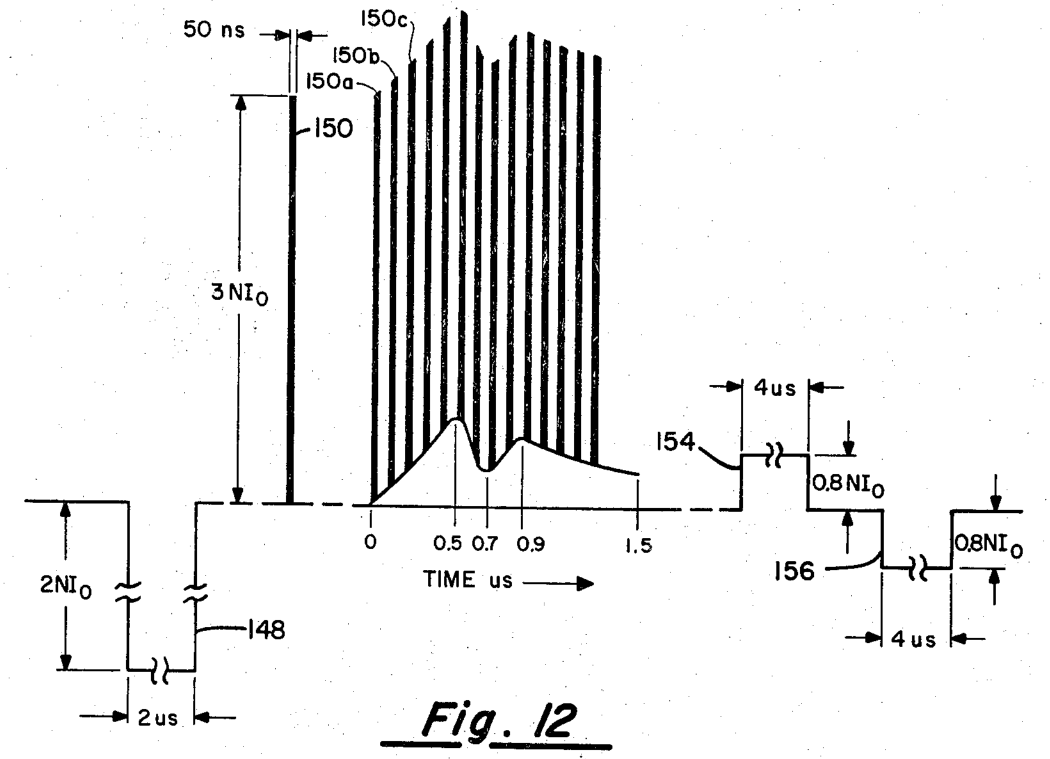
FIG. 12 is an illustration of the control signals associated with the embodiment of FIG. 11.

With particular reference to FIGS. 11 and 12 there is disclosed another embodiment of the present invention wherein the detectors are two-apertured transfluxors providing nondestructive readout of the information stored therein. Input signal sources 130 and 132 could be any constant current transient signal source but here are analogous to delays 46 and 52 while clear-strobe source 134 is analogous to strobe generator 44 and detectors 136 and 138 are analogous to detectors 54 and 60 of FIG. 8. Read-reset source 135 has no analogous component in FIG. 8 but is required in the transfluxor detector to provide the read-reset signals that are coupled to the small apertures thereof. Detector 136, as does detector 138, includes two transfluxors; information transfluxor 140, and buck-out transfluxor 142. The signal defining the information to be stored in detector 136 is coupled only to the large aperture of transfluxor 140 in a first magnetic sense from source 130 by way of conductor 144 while the clear-strobe signal from source 134 is coupled to transfluxors 140 and 142 in the same first magnetic sense by way of conductor 145, the output conductor 146 is coupled to the small apertures of transfluxors 140 and 142 in the first and a second and opposite magnetic sense, respectively, and the read-reset signal is coupled to the small apertures of transfluxors 140 and 142 in the same first magnetic sense by way of conductor 147.

As with the arrangement of FIG. 9 the use of buck-out transfluxor 142 simplifies the readout process and allows a greater variation in strobe pulse characteristics as follows. Preparatory to the sampling operation the core defining periphery of the large apertures of transfluxors 140 and 142 are initially set into a clear state such as $-\phi_s$ of FIG. 5 by the coupling of clear pulse 148 to conductor 145. Next, for the sampling operation signal 30 is coupled to conductor 144 concurrently with the relatively delayed coupling of strobe pulse 150 to conductor 145. As the information signal is coupled only to the aperture of transfluxor 140 and as the strobe pulse 150 is coupled to the large apertures of both transfluxors 140 and 142 each transfluxor is effected by a different magnetomotive force, the large aperture of transfluxor 142 which is effected only by strobe pulse 150 is, for example, placed in the $\phi_0$ state while the large aperture of transfluxor 140 which is effected by both signal 30 and the strobe pulse 150 is placed in a state of greater flux reversal such as for example $\phi_1$.

Upon readout, read-reset source 135 couples to conductor 147 read pulse 154, which is of the opposite magnetic sense as regards transfluxors 140 and 142 as is the clear pulse 148 and is coupled only to the small apertures of transfluxors 140 and 142, reversing in the leg between the large and small apertures that amount of flux reversed by the previously coupled signal 30 and strobe pulse 150 as regards transfluxor 140 and that amount of flux reversed by the previously coupled strobe pulse 150 as regards transfluxor 142. This change, of the flux states of the flux about the small apertures of transfluxors 140 and 142, corresponds to a flux change from $\phi_1$ and $\phi_0$, respectively, back to their original flux state $-\phi_s$ produces a net flux change $\phi_1-\phi_0$ effecting output conductor 146 due to the opposite wound sense of conductor 146 about the small apertures of transfluxors 140 and 142. This difference flux then is the effective-output-signal-producing-flux-change and accordingly produces an output signal in conductor 146 that is substantially independent of the strobe signal 150 characteristic and which is indicative of the amplitude of the sampled portion of signal 30.

After the readout operation read-reset source 135 couples to conductor 147 reset pulse 156, which has the same waveform characteristic as does read pulse 154 but of the opposite polarity, and which is coupled to the small apertures of transfluxors 140 and 142. Reset pulse 156 resets the flux reversed by the readout pulse 154 in the leg between the large and small apertures setting the flux states of transfluxors 140 and 142 back into their informational state prior to the readout operation. Subsequent couplings of readout pulse 154 reset pulse 156 to conductor 147 provide nondestructive readout on conductor 146 of the information stored in detector 136.

As with the above discussed operation of the system of FIG. 8, the signals from sources 130 and 132 could be signal 30 delayed various delay times while the strobe pulse 150 could be delayed preferably at least as long as the longest delay of signal 30. As illustrated in FIG. 8 with the use of fourteen detectors, such as detectors 136 and 138, and fourteen associated input sources such as input sources 130 and 132 a first input source delaying signal 30 a time $D=50$ ns. and each other input source providing a delay of an additional 100 ns. and with strobe pulse 150 being delayed an amount equal to the greatest delay of 1.35 $\mu$s. the successive magnetomotive forces of pulses 150*a*, 150*b*, 150*c*, etc., would be gated into detectors 136, 138, etc., at successively increasing delay times with respect to the wave front of signal 30.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

What is claimed is:

1. A magnetic memory device comprising:

a magnetizable element having a substantially rectangular hysteresis characteristic and being capable of being operated in a time-limited, an amplitude-limited or a saturated magnetic condition as a function of a magnetic field of a predetermined amplitude-duration characteristic;

means for inductively coupling in a first magnetic sense a constant current source relatively long duration transient signal to said element;

means for inductively coupling in said first magnetic sense a constant current source time-limited relatively short duration strobe signal to said element;

said strobe signal concurrent with a relatively short duration sampled portion of said transient signal;

means inductively coupling in a second magnetic sense, opposite to said first magnetic sense, a constant current source saturating read signal to said element;

means inductively coupled to said element wherein upon the coupling of said read signal to said element there is induced therein a signal whose amplitude is representative of the amplitude of said transient signal sampled portion.

2. A magnetic memory device comprising:

a magnetizable element having a substantially rectangular hysteresis characteristic and being capable of being operated in a time-limited, an amplitude-limited or a saturated magnetic condition as a function of a magnetic field of a predetermined amplitude-duration characteristic;

means for inductively coupling in a first magnetic sense a constant current source saturating clear signal to said element;

means for inductively coupling to said element in a second magnetic sense, opposite to said first magnetic sense, a constant current source relatively long duration transient signal of an amplitude-duration characteristic insufficient to substantially effect the magnetic state set by said clear signal;

means for inductively coupling in said second magnetic sense a constant current source time-limited relatively short duration strobe signal to said element;

said strobe signal concurrent with a relatively short duration sampled portion of said transient signal;

means inductively coupling in first magnetic sense a constant current source saturating read signal to said element;

means inductively coupled to said element wherein upon the coupling of said read signal to said element a signal is induced therein representative of the amplitude of said transient signal sampled portion.

3. A magnetic memory device comprising:

a magnetizable element having a substantially rectangular hysteresis characteristi cand being capable of being operated in a time-limited, an amplitude-limited or a saturated magnetic condition as a function of a magnetic field of a predetermined amplitude-duration characteristic;

a first constant current source coupling to said element a clear pulse of a first magnetic sense having a predetermined amplitude-duration characteristic placing said element in a first substantially saturated magnetic state;

a second constant current source coupling to said element a transient signal of a second magnetic sense opposite to said first magnetic sense and having a predetermined amplitude-duration characteristic insufficient to substantially effect the said first magnetic state of said element;

a third constant current source coupling to said element a strobe pulse of said second magnetic sense and of substantially less duration than said transient signal and having a predetermined amplitude-duration characteristic capable of substantially effecting the said first magnetic state of said element and placing said element into a different first time-limited magnetic state;

said strobe pulse and said transient signal concurrently coupled to said element with said strobe pulse delayed a predetermined time with respect to the leading edge of said transient signal;

said strobe pulse acting as a flux gate to the concurrent portion of said transient signal and causing the magnetic state of said element to be placed in a second time-limited magnetic state;

a fourth constant current source coupling to said element a read pulse of said first magnetic sense having a predetermined amplitude-duration characteristic sufficient to place the magnetic state of said element back into its said first substantially saturated magnetic state from its said second time-limited magnetic state;

an output means for producing an output signal indicative of the flux change from said second time-limited magnetic state to said first substantially saturated magnetic state.

4. A magnetic memory device comprising:

a magnetizable element having a substantially rectangular hysteresis characteristic and being capable of being operated in a time-limited, an amplitude-limited or a saturated magnetic condition as a function of a magnetic field of a predetermined amplitude-duration characteristic;

constant current source means coupling to said element a clear pulse of a first magnetic sense having a predetermined amplitude-duration characteristic placing said element in a first substantially saturated magnetic state;

constant current source means coupling to said element a transient signal of a second magnetic sense opposite to said first magnetic sense and having a predetermined amplitude-duration characteristic insufficient to substantially effect the said first magnetic state of said element;

constant current source means coupling to said element a strobe pulse of said second magnetic sense and of substantially less duration than said transient signal and having a predetermined amplitude-duration characteristic capable of substantially effecting the said first magnetic state of said element and placing said element into a different first time-limited magnetic state;

said strobe pulse and said transient signal concurrently coupled to said element with said strobe pulse delayed a predetermined time with respect to the leading edge of said transient signal;

said strobe pulse acting as a flux gate to the concurrent portion of said transient signal and causing the magnetic state of said element to be placed in a second time-limited magnetic state;

constant current source means coupling to said element a read pulse of said first magnetic sense having a predetermined amplitude-duration characteristic sufficient to place the magnetic state of said element back into its said first substantially saturated magnetic state from its said second time-limited magnetic state;

an output means for producing an output signal indicative of the flux change from said second time-limited magnetic state to said first substantially saturated magnetic state.

5. A magnetic memory device comprising:

first and second substantialliy similar magnetizable elements each having a substantially rectangular hysteresis characteristic and being capable of being operated in a time-limited, an amplitude-limited or a saturated magnetic condition as a function of a magnetic field of a predetermined amplitude-duration characteristic;

means for inductively coupling in a first magnetic sense a constant current source saturating clear signal to said first and second elements;

means for inductively coupling in a second magnetic sense, opposite to said first magnetic sense, a constant current source relatively long duration transient signal to said first element;

means for inductively coupling in said second magnetic sense, a constant current source time-limited relatively short duration strobe signal to said first and second elements;

said strobe signal concurrent with a relatively short duration sampled portion of said transient signal;

means inductively coupling in said first magnetic sense a constant current source saturating read signal to said first and second elements;

means inductively coupled to said first element in said first and second magnetic sense and to said second element in a magnetic sense opposite to said first element wherein upon the coupling of said read signal to said first and second elements bucking signals of different amplitudes are induced therein producing a difference amplitude signal representative of the amplitude of said transient signal sampled portion.

6. A magnetic memory device comprising;

first and second substantially similar magnetizable elements each having a substantially rectangular hysteresis characteristic and being capable of being operated in a time-limited, an amplitude-limited or a saturated magnetic condition as a function of a magnetic field of a predetermined amplitude-duration characteristic;

means for inductively coupling to said first element in a first magnetic sense a constant current source transient input signal of insufficient amplitude-duration characteristic to substantially effect the magnetic state of said element;

means for inductively coupling to said first and second elements in said first magnetic sense a constant current source time-limited strobe signal;

said strobe signal individually capable of placing the magnetic state of said first and second elements in a first time-limited magnetic state;

said strobe signal delayed with respect to said input signal and concurrent with a small sampled portion of said input signal, said strobe signal and said input signal sampled portion effective to place said first element in a second time-limited magnetic state;

means for inductively coupling to said first and second elements in a second magnetic sense, opposite to said first magnetic sense, a constant current source saturating read signal;

means inductively coupled to said first element in said first or second magnetic sense and to said second element in an opposite magnetic sense wherein upon the coupling of said read signal to said first and second elements, bucking signals of different amplitudes are induced therein producing a difference amplitude signal representative of the amplitude of said input signal sampled portion.

7. A magnetic memory device comprising:

first and second substantially similar magnetizable elements each having a substantially rectangular hysteresis characteristic and being capable of being operated in a time-limited, an amplitude-limited or a saturated magnetic condition as a function of a magnetic field of a predetermined amplitude-duration characteristic;

means for inductively coupling in a first magnetic sense a constant current source relatively long duration transient signal to said first element;

means for inductively coupling in said first magnetic sense a constant current source time-limited relatively short duration strobe signal to said first and second elements;

said strobe signal concurrent with a relatively short duration sampled portion of said transient signal;

means inductively coupling in a second magnetic sense, opposite to said first magnetic sense, a constant current source saturating read signal to said first and second elements;

means inductively coupled to said first element in said first or second magnetic sense and to said second element in a magnetic sense opposite to said first element wherein upon the coupling of said read signal to said first and second elements bucking signals of different amplitudes are induced therein producing a difference amplitude signal representative of the amplitude of said transient signal sampled portion.

8. A magnetic memory device comprising:

first and second substantially similar magnetizable cores each having a substantially rectangular hysteresis characteristic and being capable of being operated in a time-limited, an amplitude-limited or a saturated magnetic condition as a function of a magnetic field of a predetermined amplitude-duration characteristic;

means for inductively coupling in a first magnetic sense a constant current source input signal to said first core;

said input signal having an insufficient amplitude-duration characteristic to substantially effect the magnetic state of said first core;

means for inductively coupling in said first magnetic sense a constant current source time-limited strobe signal to said first and second cores;

said strobe signal delayed with respect to the leading edge of said input signal and concurrent with a sampled portion of said input signal;

means for inductively coupling in a second magnetic sense, opposite to said first magnetic sense, a constant current source saturating read signal to said first and second cores;

means inductively coupled to said first core in said first or second magnetic sense and to said second core in an opposite magnetic sense wherein upon the coupling of said read signal to said first and second cores, bucking signals of different amplitudes are induced therein producing a difference amplitude signal representative of the amplitude of said input signal sampled portion.

9. A magnetic memory device comprising:

first and second substantially similar magnetizable cores each having a substantially rectangular hysteresis characteristic and being capable of being operated in a time-limited, an amplitude-limited or a saturated magnetic condition as a function of a magnetic field of a predetermined amplitude-duration characteristic;

means for inductively coupling in a first magnetic sense a saturating clear signal to said first and second cores;

means for inductively coupling in a second magnetic sense a constant current source input signal to said first core;

said input signal having an insufficient amplitude-duration characteristic to substantially effect the saturated magnetic state of said first core;

means for inductively coupling in said second magnetic sense a constant current source time-limited strobe signal to said first and second cores;

said strobe signal delayed with respect to the leading edge of said input signal and concurrent with a sampled portion of said input signal;

means for inductively coupling in said first magnetic sense a constant current source saturating read signal to said first and second cores;

means inductively coupled to said first core in said first or second magnetic sense and to said second core in an opposite magnetic sense wherein upon the coupling of said read signal to said first and second cores, bucking signals of different amplitudes are induced therein producing a difference amplitude signal representative of the amplitude of said input signal sampled portion.

10. A magnetic memory device comprising:

first and second substantially similar transfluxor type magnetizable elements each having a high and a low reluctance path, each path having a substantially rectangular hysteresis characteristic and being capable of being operated in a time-limited, an amplitude-limited or a saturated magnetic condition as a function of a magnetic field of a predetermined amplitude-duration characteristic;

means for inductively coupling to said first element's high reluctance path in a first magnetic sense a constant current source transient input signal of insufficient amplitude-duration characteristic to substantially effect the magnetic state of said path;

means for inductively coupling to said first and second element's high reluctance paths in said first magnetic sense a constant current source time-limited strobe signal;

said strobe signal individually capable of placing the magnetic state of said high reluctance paths in a first time-limited magnetic state;

said strobe signal delayed with respect to said input signal and concurrent with a small sampled portion of said input signal, said strobe signal and said input signal sampled portion effective to place said first element's high reluctance path in a second time-limited magnetic state;

means for inductively coupling to said first and second element's low reluctance paths in a second magnetic sense, opposite to said first magnetic sense, a constant current source saturating read signal;

means inductively coupled to said first element's low reluctance path in said first or second magnetic sense and to said second element's low reluctance path in an opposite magnetic sense wherein upon the coupling of said read signal to said first and second elements, bucking signals of different amplitudes are induced therein producing a difference amplitude signal representative of the amplitude of said input signal sampled portion.

11. A magnetic memory device comprising:

a transfluxor type magnetizable element having first and second apertures therethrough, each aperture defining high and low reluctance paths, respectively, and each path having a substantially rectangular hysteresis characteristic and being capable of being operated in a time-limited, an amplitude-limited or a saturated magnetic condition as a function of a magnetic field of a predetermined amplitude-duration characteristic;

means for inductively coupling in a first magnetic sense a constant current source saturating clear signal to said element's first aperture;

means for inductively coupling to said element's first aperture in a second magnetic sense, opposite to said first magnetic sense, a constant current source relatively long duration transient signal of an amplitude-duration characteristic insufficient to substantially effect the magnetic state set by said clear signal;

means for inductively coupling in said second magnetic sense a constant current source time-limited relatively short duration strobe signal to said element's first aperture;

said strobe signal concurrent with a relatively short duration sampled portion of said transient signal;

means inductively coupling in first magnetic sense a constant current source saturating read signal to said element's second aperture;

means inductively coupled to said element's second aperture wherein upon the coupling of said read signal to said element's second aperture a signal is induced therein representative of the amplitude of said transient signal sampled portion.

12. A magnetic memory device, comprising:

first and second substantially similar magnetizable transfluxor type cores each having a substantially rectangular hysteresis characteristic and being capable of being operated in a time-limited, an amplitude-limited or a saturated magnetic condition as a function of a magnetic field of a predetermined amplitude-duration characteristic;

said first and second cores each having first and second apertures therethrough;

first and second magnetic flux paths defined by the peripheries of said first and second apertures, wherein the effective reluctance of said first path is substantially larger than that of said second path;

clear means coupling the high reluctance paths of said first and second cores for inductively coupling in a first magnetic sense a clear signal having a saturating amplitude-duration characteristic for setting the flux about said high reluctance paths into a first substantially saturated magnetic condition;

input means coupling the high reluctance path of said first core for inductively coupling in a second magnetic sense an input signal having a time-limited amplitude-duration characteristic for switching a corresponding portion of the flux about said high reluctance path into a corresponding one of a plurality of information states, the switched portion of which is set into a magnetic condition opposite to said first magnetic condition;

output means coupling the low reluctance paths of said first and second cores in opposite magnetic senses;

read means coupling a read signal having a saturating amplitude-duration characteristic to the low reluctance paths of said first and second cores in the same magnetic sense for causing the flux about said low reluctance path to be switched into a read condition for causing an output signal to be induced in said output means, the amplitude of which is representative of the information state of the flux about said high reluctance path.

13. A magnetic memory device, comprising:

first and second substantially similar magnetizable transfluxor type cores each having a substantially rectangular hysteresis characteristic and being capable of being operated in a time-limited, an amplitude-limited or a saturated magnetic condition as a function of a magnetic field of a predetermined amplitude-duration characteristic;

said first and second cores each having first and second apertures therethrough;

first and second magnetic flux paths defined by the peripheries of said first and second apertures, wherein the effective reluctance of said first path is substantially larger than that of said second path;

clear means coupling the first apertures of said first and second cores for inductively coupling in a first magnetic sense a clear signal having a saturating amplitude-duration characteristic for setting the flux about said first apertures into a first substantially saturated magnetic condition;

input means coupling the first aperture of said first core for inductively coupling in a second magnetic sense an input signal having a time-limited amplitude-duration characteristic for switching a corresponding portion of the flux about said first aperture into a corresponding one of a plurality of information states, the switched portion of which is set into a magnetic sense opposite to said first magnetic sense;

output means coupling the second apertures of said first and second cores in opposite magnetic senses;

read means coupling a read signal having a saturating amplitude-duration characteristic to the second apertures of said first and second cores in the same magnetic sense for causing the flux about said second apertures to be switched into a read condition for causing an output signal to be induced in said output means the amplitude of which is representative of the information state of the flux about said first aperture.

14. The method of operating a magnetizable memory element having a substantially rectangular hysteresis characteristic and being capable of being operated in a time-limited, an amplitude-limited or a saturated magnetic condition as a function of a magnetic field of a predetermined amplitude-duration characteristic as an analog sampling device, comprising the steps of:

subjecting the element to a constant current source saturating clear field of a first magnetic sense placing said element in an initial saturated clear state;

subjecting the element to a constant current source transient field of a second magnetic sense, opposite from said first magnetic sense, which transient field is of an insufficient amplitude-duration characteristic to substantially effect said clear state;

subjecting the element to a constant current source time-limited strobe pulse field of said second magnetic sense which strobe pulse field is of a sufficient time-limited amplitude-duration characteristic to individually move the magnetic state of said element from said saturated clear state to a first time-limited state;

delaying the said strobe pulse field with respect to the leading edge of said transient field causing said delayed strobe pulse field to be concurrent with and additive to a concurrent sampled portion of said transient field causing said element to be placed in a second time-limited magnetic state;

subjecting the element to a constant current source saturating read field of said first magnetic sense causing the magnetic state of said element to move from said second time-limited magnetic state into a read state;

generating an output signal whose amplitude is representative of the difference in the flux levels of said second time-limited magnetic state and said read state and thereby representative of the amplitude of the sampled portion of said transient field.

15. The method of operating a magnetizable memory device including first and second substantially similar elements each element having a substantially rectangular hysteresis characteristic and being capable of being operated in a time-limited, an amplitude-limited or a saturated magnetic condition as a function of a magnetic field of a predetermined amplitude-duration characteristic as an analog sampling device, comprising the steps of:

subjecting the first and second elements to a constant current source saturating clear field of a first magnetic sense placing said elements in an initial saturated clear state;

subjecting the first element to a constant current source transient field of a second magnetic sense, opposite from said first magnetic sense, which transient field is of an insufficient amplitude-duration characteristic to substantially effect said clear state;

subjecting the first and second elements to a constant current source time-limited strobe pulse field of said second magnetic sense which strobe pulse field is of a sufficient time-limited amplitude-duration characteristic to individually move the magnetic state of said elements from said saturated clear state to a first time-limited state;

delaying the said strobe pulse field with respect to the leading edge of said transient field causing said delayed strobe pulse field to be concurrent with an additive to a concurrent sampled portion of said transient field causing said first element to be placed in a second time-limited magnetic state;

subjecting the first and second element to a constant current source saturating read field of said first magnetic sense causing the magnetic states of said elements to move from said second and first time-limited magnetic states, respectively, into a read state;

generating an output signal whose amplitude is representative of the difference in the flux levels of said first and second time-limited magnetic states and thereby representative of the amplitude of the sampled portion of said transient field.

16. The method of operating a magnetizable memory element having a substantially rectangular hysteresis characteristic and being capable of being operated in a time-limited, an amplitude-limited or a saturated magnetic condition as a function of magnetic field of a predetermined amplitude-duration characteristic as an analog sampling device, comprising the steps of:

subjecting the element to a constant current source saturating clear field of a first magnetic sense placing said element in an initial saturated clear state;

subjecting the element to a constant current source transient field of a second magnetic sense, opposite from said first magnetic sense, which transient field is of an insufficient amplitude-duration characteristic to substantially effect said clear state;

subjecting the element to a constant current source time-limited strobe pulse field of said second magnetic sense which strobe pulse field is of a sufficient time-limited amplitude-duration characteristic to individually move the magnetic state of said element from said saturated clear state to a first time-limited state;

delaying the said strobe pulse field with respect to the leading edge of said transient field causing said delayed strobe pulse field to be concurrent with and additive to a concurrent sampled portion of said transient field causing said element to be placed in a second time-limited magnetic state;

subjecting the element to a constant current source saturating read field of said first magnetic sense causing the magnetic state of said element to move from said second time-limited magnetic state back into its initial saturated clear state;

generating an output signal whose amplitude is representative of the difference in the flux levels of said second time-limited magnetic state and said clear state and thereby representative of the amplitude of the sampled portion of said transient field.

17. The method of operating a magnetizable memory device including first and second substantially similar elements each element having a substantially rectangular hysteresis characteristic and being capable of being operated in a time-limited, an amplitude-limited or a saturated magnetic condition as a function of a magnetic field of a predetermined amplitude-duration characteristic as an analog sampling device, comprising the steps of:

subjecting the first and second elements to a constant current source saturating clear field of a first magnetic sense placing said elements in an initial saturated clear state;

subjecting the first element to a constant current source transient field of a second magnetic sense, opposite from said first magnetic sense, which transient field is of an insufficient amplitude-duration characteristic to substantially effect said clear state;

subjecting the first and second elements to a constant current source time-limited strobe pulse field of said second magnetic sense which strobe pulse field is of a sufficient time-limited amplitude-duration characteristic to individually move the magnetic state of said elements from said saturated clear state to a first time-limited state;

delaying the said strobe pulse field with respect to the leading edge of said transient field causing said delayed strobe pulse field to be concurrent with and additive to a concurrent sampled portion of said transient field causing said first element to be placed in a second time-limited magnetic state;

subjecting the first and second elements to a constant current source saturating read field of said first magnetic sense causing the magnetic states of said elements to move from said second and first time-limited magnetic states, respectively, back into their initial saturated clear state;

generating an output signal whose amplitude is representative of the difference in the flux levels of said first and second time-limited magnetic states and thereby representative of the amplitude of the sampled portion of said transient field.

References Cited

UNITED STATES PATENTS 3,015,809 1/1962 Myers -------------- 340—174

BERNARD KONICK, *Primary Examiner.*

S. URYNOWICZ, *Assistant Examiner.*